Patented Mar. 15, 1932

1,849,489

UNITED STATES PATENT OFFICE

LOUIS H. HOWLAND, OF PASSAIC, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing.  Application filed November 13, 1929. Serial No. 407,010.

The invention relates to the treatment of rubber and similar vulcanizable materials and particularly to a method and product thereof, whereby the deterioration of rubber is retarded.

An object of this invention is to provide a class of chemicals adapted to retard the deterioration of rubber. Another object is to provide a class of chemicals adapted to retard the deterioration of rubber during vulcanization as well as after vulcanization.

Accordingly the invention comprises treating rubber or similar vulcanizable materials with sulphur derivatives of phenols, having the general formula $R-S_xR'$ where R and R' are the same or different hydroxy-aromatic residues or substituted hydroxy aromatic residues and $x$ is an integer having a value of one or more. Typical of this class is $HO-C_{10}H_6-S_x-C_{10}H_6-OH$ where $x$ may be 1, 2, 4 etc. giving $HO-C_{10}H_6-S-C_{10}H_6-OH$ the monosulphide;

$HO-C_{10}H_6-S-S-C_{10}H_6-OH$ the disulphide;

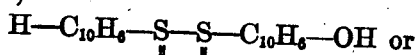

$HO-C_{10}H_6-S-S-S-S-C_{10}H_6$ the tetrasulphide.

Other examples of this class of chemicals are the sulphides of the following phenols: phenol, cresol, xylenol, alpha-naphthol, resorcinol and other similar compounds or sulphides which contain any two of these in the same molecule.

If desired, in order to oppose or check any retarding effect that the sulphide may have on the rate of vulcanization, an inorganic or organic base may be used with the sulphide.

The following examples are to be understood as illustrative of the invention and not limiting thereof:

*Example 1.*—100 parts of rubber, 10 parts zinc oxide, 3 parts sulfur, .3 part heptaldehyde aniline condensation product diluted with spindle oil, and 1.25 parts of beta-naphthol sulfide mixed with .25 part of polyethylene polyamine, are mixed on the mill in the usual manner and vulcanized in a press under 40 pounds steam pressure for 30 and 60 minutes. Polyethylene polyamine is a mixture of high boiling aliphatic amines made by reacting an ethylene dihalide with ammonia and preferably made in the manner set forth in U. S. P. 1,840,932. The mixture with beta naphthol is made by melting 5 grams of polyethylene polyamine with 25 grams of the sulphide, and cooling the solution. The cooled mass is a soft brownish solid. Similar stocks are also made up to which no antioxidants were added, and others to which 1.5 parts of the commercial antioxidant, acetaldehyde aniline condensation product prepared in strongly acid solution, were added. The green tensiles of these three stocks, together with their tensiles after ageing for 216 hours at 140° F. in oxygen under a pressure of 300 pounds per square inch are tabulated as follows:

| Green tensiles | No antioxidant | 1.5 pt. acetaldehyde-aniline condensation product | 1.25 parts of beta naphthol sulfide mixed with .25 part of polyethylene polyamine |
|---|---|---|---|
| 30′ @ 40# | 2405 | 2685 | 3260 |
| 60′ @ 40# | 2360 | 2460 | 3420 |
| Aged 216 hrs. in oxy. @ 140° F. under 300# per sq. in. | | | |
| 30′ @ 40# | 1740 | 2320 | 3045 |
| 60′ @ 40# | 382 | 1935 | 2880 |

*Example 2.*—The invention can, however, be carried out in other ways. The beta-naphthol-sulfide and the polyethylene polyamine may be incorporated separately. 1.25 parts of beta-naphthol-sulphide and .25 part of polyethylene polyamine are incorporated in the usual manner in a mix consisting of 100 rubber, 10 zinc oxide and .3 heptaldehyde-aniline reaction product diluted with spindle oil. A similar mix is made containing none of the antioxidant materials. Both mixes are cured in a mold at a temperature corresponding to 40 pounds steam pressure for 30 minutes and 60 minutes. The cured stocks are then aged for 216 hours in an oxygen bomb. The tensiles are as follows:

| Green tensiles | Antioxidant | No antioxidant |
|---|---|---|
| 30′ @ 40#  | 2610 | 2595 |
| 60′ @ 40#  | 3680 | 2715 |
| Aged 216 hrs. in oxygen | | |
| 30′ @ 40#  | 2730 | 1725 |
| 60′ @ 40#  | 2555 | 1175 |

*Example 3.*—An example of the use of a phenol sulfide as an antioxidant, without the addition of a base, is as follows: 1.5 parts of beta-naphthol-sulfide are incorporated in the usual manner with 100 smoked sheet rubber, 50 carbon black, 13 zinc oxide, 5 pine tar, 1 palm oil, 3.5 sulfur, 1 hexamethylene tetramine, and 0.25 of diphenyl-guanidine. A similar mix is made without the antioxidant. These mixes are cured in a mold at 45 pounds steam pressure for 50, 60 and 75 minutes. These cures are then aged 168 hours in the oxygen bomb. The tensiles before and after ageing are as follows:

| Green tensiles | Antioxidant | No antioxidant |
|---|---|---|
| 50′ @ 45#  | 4325 | 3975 |
| 60′ @ 45#  | 4385 | 4020 |
| 75′ @ 45#  | 4415 | 4100 |
| Aged 168 hrs. in oxygen | | |
| 50′ @ 45#  | 2645 | 1815 |
| 60′ @ 45#  | 2670 | 1710 |
| 75′ @ 45#  | 2520 | 1765 |

The product may be prepared by any of the methods described in the literature. One method of preparation is as follows: 29 grams of beta-naphthol is dissolved in 50 cc. of an aqueous solution containing 8 grams of sodium hydroxide. To the boiling solution is added 7 grams of sulfur. The sulfur goes into solution. This solution is boiled gently over a free flame for two hours and is then allowed to stand on a steam bath for 24 hours. At the end of this time, water is added and boiling continued for a short time. This solution is poured into 500 cc. of water containing a small amount of alkali. After filtering, the solution is neutralized with dilute sulfuric acid. The precipitated naphthol sulfides are then recovered by filtration, washed thoroughly and air dried. The product in this condition is ready for use.

Another manner of preparation is as follows:

188 grams of phenol is dissolved in 750 cc. of chloroform. The solution is cooled by a freezing mixture of ice and salt. During vigorous stirring, 150 grams of sulfur chloride dissolved in 200 cc. of chloroform, is slowly run in. The addition takes place over a period of about two hours. A solid separates. After standing over night, the separated product is filtered, and washed with chloroform. The product is then dissolved in dilute sodium hydroxide and reprecipitated by neutralization with dilute sulfuric acid. The product is dried and powdered. 25 grams of the phenol sulfide thus formed are melted together with 5 grams of polyethylene poyamine. On cooling, the product solidified to a brown rosin-like substance, which is readily powdered.

*Example 4.*—1.5 parts of the last mentioned product are incorporated in the usual manner in a stock consisting of 100 rubber, 10 zinc oxide, 3 sulfur and .3 part of a heptaldehyde aniline condensation product diluted with spindle oil. This mix is vulcanized in a mold under 40 pounds steam pressure for 30 minutes and 60 minutes. A similar mix is made from which the antioxidant material has been omitted. This mix is vulcanized under the same conditions. The resulting stocks are aged in the oxygen bomb for 216 hours. The tensiles obtained are given below:

| Green tensiles | 1.5 pts. antioxidant | No antioxidant |
|---|---|---|
| 30′ @ 40#  | 2565 | 2345 |
| 60′ @ 40#  | 3160 | 2830 |
| Aged 216 hours in oxygen | | |
| 30′ @ 40#  | 1790 | 1175 |
| 60′ @ 40#  | 2060 | Too poor to test. |

The chemicals disclosed may be added to rubber by any of the methods known to the art, for example, they may be added to the rubber mix on the mill or they may be applied to the rubber after vulcanization by dipping, painting, spraying or in other ways. Or they may be mixed with rubber latex or dissolved in a suitable solvent and added to the latex in this way.

The use of this class of chemicals for retarding the deterioration of rubber, is, of course, not limited to the types of stock described in the example given. Any of the usual ingredients of a rubber mix may be varied at will and any other accelerators than those mentioned in the example given may be used.

The term "a phenol" in the specification and claims is to be construed broadly, as meaning phenol, its homologues or analogues. The term "rubber" is to be understood as covering rubber, gutta percha, balata, and other rubber-like materials.

With the detailed disclosure above given, it will be obvious that modifications will suggest themselves and it is not desired to limit the invention otherwise than as set forth in the appended claims.

Having thus described my invention, what I claim and desire to protect by Letters Patent is:

1. A method of treating rubber which comprises incorporating with rubber a compound having the general formula R—$S_x$—R′ where R and R′ are the same or different hydroxy-aromatic residues or substituted hydroxy-aromatic residues and $x$ is an integer having a value of one or more.

2. A method of treating rubber which comprises incorporating with rubber a compound having the general formula R—$S_x$—R′ where R and R′ are the same or different hydroxy-aromatic residues or substituted hydroxy-aromatic residues and $x$ is an integer having a value of one or more, and subsequently vulcanizing the rubber.

3. A method of treating rubber which comprises mixing with rubber a phenol sulphide.

4. A method of treating rubber which comprises mixing with rubber a phenol sulphide, and vulcanizing the rubber.

5. A method of treating rubber which comprises vulcanizing rubber in the presence of a phenol sulphide.

6. A method of treating rubber which comprises incorporating with rubber a phenol sulphide, and subsequently vulcanizing the rubber.

7. A method of treating rubber which comprises vulcanizing rubber containing a sulphide of a phenol in the presence of a base.

8. A method of treating rubber which comprises vulcanizing rubber containing a phenol sulphide in the presence of polyethylene polyamine.

9. A method of treating rubber which comprises incorporating with rubber a sulphide of beta naphthol.

10. A method of treating rubber which comprises vulcanizing rubber containing beta naphthol sulphide in the presence of a base.

11. A method of treating rubber which comprises vulcanizing rubber containing beta naphthol sulphide in the presence of polyethylene polyamine.

12. A rubber composition derived from rubber treated with a compound having the general formula R—$S_x$—R′ where R and R′ are the same or different hydroxy-aromatic residues or substituted hydroxy-aromatic residues and $x$ is an integer having a value of one or more.

13. A vulcanized rubber composition derived from rubber treated with a compound having the general formula R—$S_x$—R′ where R and R′ are the same or different hydroxy-aromatic residues or substituted hydroxy-aromatic residues and $x$ is an integer having a value of one or more.

14. A rubber composition derived from rubber treated with a phenol sulphide.

15. A vulcanized rubber composition derived from rubber treated with a phenol sulphide.

16. A rubber composition derived from rubber treated with phenol sulphide.

17. A vulcanized rubber composition derived from rubber treated with a phenol sulphide and a base.

18. Vulcanized rubber derived from rubber treated with a base and phenol sulphide.

19. Vulcanized rubber derived from rubber containing phenol sulphide and polyethylene polyamine.

20. Vulcanized rubber derived from rubber containing beta naphthol sulphide and polyethylene polyamine.

Signed at Passaic, county of Passaic, State of New Jersey, this 8th day of November, 1929.

LOUIS H. HOWLAND.